US008783191B2

(12) United States Patent
Auer

(10) Patent No.: US 8,783,191 B2
(45) Date of Patent: Jul. 22, 2014

(54) DRIVE IN AID AND VEHICLE TREATMENT SYSTEM

(75) Inventor: Robert Auer, Augsburg (DE)

(73) Assignee: WashTec Holding GmbH, Augsburg (DE)

( * ) Notice: Subject to any disclaimer, the term of this patent is extended or adjusted under 35 U.S.C. 154(b) by 39 days.

(21) Appl. No.: 13/635,461

(22) PCT Filed: Feb. 7, 2011

(86) PCT No.: PCT/EP2011/051744
§ 371 (c)(1),
(2), (4) Date: Dec. 6, 2012

(87) PCT Pub. No.: WO2011/117015
PCT Pub. Date: Sep. 29, 2011

(65) Prior Publication Data
US 2013/0228093 A1 Sep. 5, 2013

(30) Foreign Application Priority Data
Mar. 22, 2010 (DE) .......................... 10 2010 016 068

(51) Int. Cl.
*B61B 9/00* (2006.01)
(52) U.S. Cl.
USPC ......... 104/165; 104/172.3; 104/247; 104/242
(58) Field of Classification Search
CPC ............ B60S 3/004; B60S 3/04; B60S 3/002; B60S 3/06; B65G 15/62; B65G 21/2072; B65G 25/04
USPC ....................... 104/242, 172.3, 165, 162, 247
See application file for complete search history.

(56) References Cited

U.S. PATENT DOCUMENTS

| 3,526,193 A | | 9/1970 | Vani | |
| 3,724,390 A | * | 4/1973 | Beer et al. | 104/172.3 |

(Continued)

FOREIGN PATENT DOCUMENTS

DE 2002565 9/2011

OTHER PUBLICATIONS

English Translation of International Preliminary Report on Patentability published Sep. 25, 2012 for PCT/EP2011/051744 filed Feb. 7, 2011.

(Continued)

*Primary Examiner* — Jason C Smith
(74) *Attorney, Agent, or Firm* — Fleit Gibbons Gutman Bongini & Bianco PL; Martin Fleit; Paul D. Bianco

(57) ABSTRACT

The invention provides a drive-in aid for a conveying device provided for transporting a vehicle to be treated in a transport direction through a vehicle treatment system, having a lane running in the transport direction for tires of the vehicle, a base plate movable transversely to the transport direction and two guide elements converging at least partially above the movable base plate in the transport direction, and a corresponding vehicle treatment system. The drive-in aid and vehicle treatment system allow the tires of the vehicle to be treated to be positioned without damage and centrally with respect to the desired lane of the conveying device. The drive-in aid is characterized in that the guide elements are movable to and fro between an approach position, in which they converge in the transport direction and extend into the lane and a drive-through position, in which they define the lane laterally.

19 Claims, 4 Drawing Sheets

(56) References Cited

U.S. PATENT DOCUMENTS

| | | | | |
|---|---|---|---|---|
| 3,832,953 | A * | 9/1974 | Aaron | 104/162 |
| 3,971,325 | A * | 7/1976 | Evans | 104/172.3 |
| RE30,026 | E * | 6/1979 | Hanna et al. | 104/172.3 |
| 4,690,065 | A * | 9/1987 | Belanger et al. | 104/172.3 |
| 4,715,287 | A * | 12/1987 | Wentworth et al. | 104/172.3 |
| 4,981,151 | A * | 1/1991 | Larson et al. | 134/123 |
| 5,027,714 | A * | 7/1991 | England | 104/162 |
| 5,038,923 | A * | 8/1991 | Evans | 198/781.02 |
| 5,228,392 | A * | 7/1993 | Belanger et al. | 104/172.3 |
| 5,432,974 | A * | 7/1995 | Yasutake et al. | 15/316.1 |
| 5,730,061 | A * | 3/1998 | Stufflebeam | 104/172.3 |
| 6,422,153 | B1 * | 7/2002 | Reitsch, Jr. | 104/172.3 |
| 7,302,894 | B2 * | 12/2007 | Belanger et al. | 104/242 |
| 7,530,317 | B1 * | 5/2009 | Belanger et al. | 104/172.3 |
| 7,571,682 | B2 * | 8/2009 | Bianco | 104/242 |
| 8,215,476 | B2 * | 7/2012 | Ennis | 198/597 |
| 2006/0219127 | A1 * | 10/2006 | Ennis | 104/165 |
| 2006/0225601 | A1 * | 10/2006 | Belanger et al. | 104/165 |
| 2008/0028974 | A1 * | 2/2008 | Bianco | 104/165 |
| 2012/0304884 | A1 * | 12/2012 | Urich et al. | 104/118 |
| 2013/0228093 | A1 * | 9/2013 | Auer | 104/247 |

OTHER PUBLICATIONS

International Search Report for PCT/EP2011/051744 published Sep. 29, 2011.

Written Opinion for PCT/EP2011/051744 dated May 2, 2011.

* cited by examiner

DRIVE IN AID AND VEHICLE TREATMENT SYSTEM

FIELD OF THE INVENTION

The invention concerns a drive-in aid and a vehicle treatment system.

BACKGROUND OF THE INVENTION

A vehicle treatment system designed as a vehicle washing system with a conveying device for the transporting of a vehicle to be treated in a transporting direction through the vehicle treatment system is known from DE 20 02 565. There, the conveying device has drag rollers arranged on a continuously circulating conveying chain, of which one roller grasps a vehicle tire of a vehicle side from behind and then drags the vehicle through the vehicle washing system. In order to guide the tires to be dragged into the lane provided for the dragging with the drag roller, guides converging in a V shape are provided in the drive-in area of the conveying device on both sides of the lane in the transporting direction, which form a drive-in aid. If the tire approaches one of these guides, it is forced into the desired lane. In order to damage the tire as little as possible while approaching the guides, the guide elements are designed as elongated guide rollers, whose rotating axes are essentially parallel to the vehicle washing system bottoms and converge in a V shape in the transporting direction. While the tire approaches, the guide rollers also rotate then so that the rubbing movements on the tire and the tire sidewall are reduced. If the tire, however, approaches a guide roller too quickly or at too steep an angle, the tire is squeezed and perhaps damaged. Moreover, due to the forcible guiding with the guide rollers, the area of the tire lying on the bottom is laterally shifted and in this way abraded.

In order to eliminate this problem, known drive-in aids have a base plate or so-called guide plate supported so that it can move transverse to the transporting direction, in addition to the guide rollers arranged in the form of a V and affixed on the bottom. A tire located on the guide plate is thus not shifted on the bottom as it approaches a guide roller, but rather moves together with the guide plane transverse to the transporting direction. The guide plate extends, for the purpose, transverse to the transporting direction into the area of the lane for the tires of the other vehicle side also, or another guide plane is provided there.

Likewise, in this drive-in aid, there is also the problem that when the approach to a guide roller is too rapid or too steep, there may be, as before, a squeezing or damage of the tires. Moreover, the violent impact caused in this way is unpleasant for the vehicle occupants.

Since for reasons of space the drive-in of many vehicle washing systems is not straight but rather curved, the trailing back tire of the vehicle drives into the drive-in area at a diagonal to the lane even with a straight drive-in of the front tire into the desired lane of the conveying device, without approaching an approach roller. Since the vehicle driver cannot see the back tires and with the vehicle steering he cannot have any direct influence on the position of the back tire, the back tire often strikes one or both approach rollers in a relatively violent manner. Thus, there is the danger of tire damage, at least of the back tire. In addition, with an unfavorable position of the back tire, it is forced into the lane by the approach rollers, but is guided so close to a side border of the lane that it is dragged along and damaged on a border guide of the conveying device.

US 2008/0028974 discloses a known drive-in aid in a vehicle washing system described above. There, the drive-in aid has a roller arrangement whose rotating axes run in the transporting direction of the vehicle and are used for the lateral shifting capacity of the vehicle. Nonmovable guide tracks are arranged in the shape of a funnel in the area of this roller arrangement; together, they are used with the roller arrangement to introduce a vehicle tire into the transporting area.

US2006/0219127 A1 discloses a similar solution, in which several, funnel-shaped guide tracks are mounted at different heights in the drive-in area. US2006/0225601 A1 discloses a similar solution, in which the guide tracks are located in the drive-in area not in the shape of a funnel, but rather with a curved shape. Such a construction can also be seen in U.S. Pat. No. 3,832,953. With these solutions also, damage to the tires and rims due to impacts or when they are dragged along as they approach the guide tracks cannot be reliably avoided.

SUMMARY OF THE INVENTION

The goal of the invention therefore is to create a drive-in aid and a vehicle treatment system that overcome the disadvantages mentioned above and make possible a damage-free middle positioning of tires of a vehicle to be treated with respect to the desired lane of the conveying device.

This goal is attained with the drive-in aid and the vehicle treatment system described herein. Advantageous developments and expedient refinements of the invention are also described herein.

A drive-in aid in accordance with the invention is characterized in that the guide elements are movable back and forth between an approach position, in which they converge into the lane in the transporting direction and a drive-through position, in which they delimit the lane laterally. In this way, the impacts caused by the approaching of the guide elements can be lessened and the danger of damaging the tire clearly reduced.

In an advantageous refinement, a restoring drive is correlated with each guide element, so as to be able to move the guide elements back into the approach position after a tire had been driven through. This ensures that the guide elements are immediately brought back into the approach position again so as to approach with another tire—either a back tire of the same vehicle or the front tire of another vehicle.

Advantageously, the restoring force applied to the guide element by the restoring drive can be readjusted, for example, by a specification of a restoring force depending on the steering of the guide elements from the approach position. In an advantageous refinement, the restoring force can be freely adjusted in another area by using pneumatically or hydraulically actuatable, single- or double-acting restoring cylinders.

A vehicle treatment system in accordance with the invention can be designed advantageously as a vehicle washing system and is characterized in that it has a drive-in aid, which is designed in accordance with the above and following description and is indicated in the claims.

BRIEF DESCRIPTION OF THE DRAWINGS

Other peculiarities and merits of the invention can be deduced from the following description of preferred embodiment examples with the aid of the drawings. The figures show the following.

DETAILED DESCRIPTION OF THE INVENTION

Figure 1:
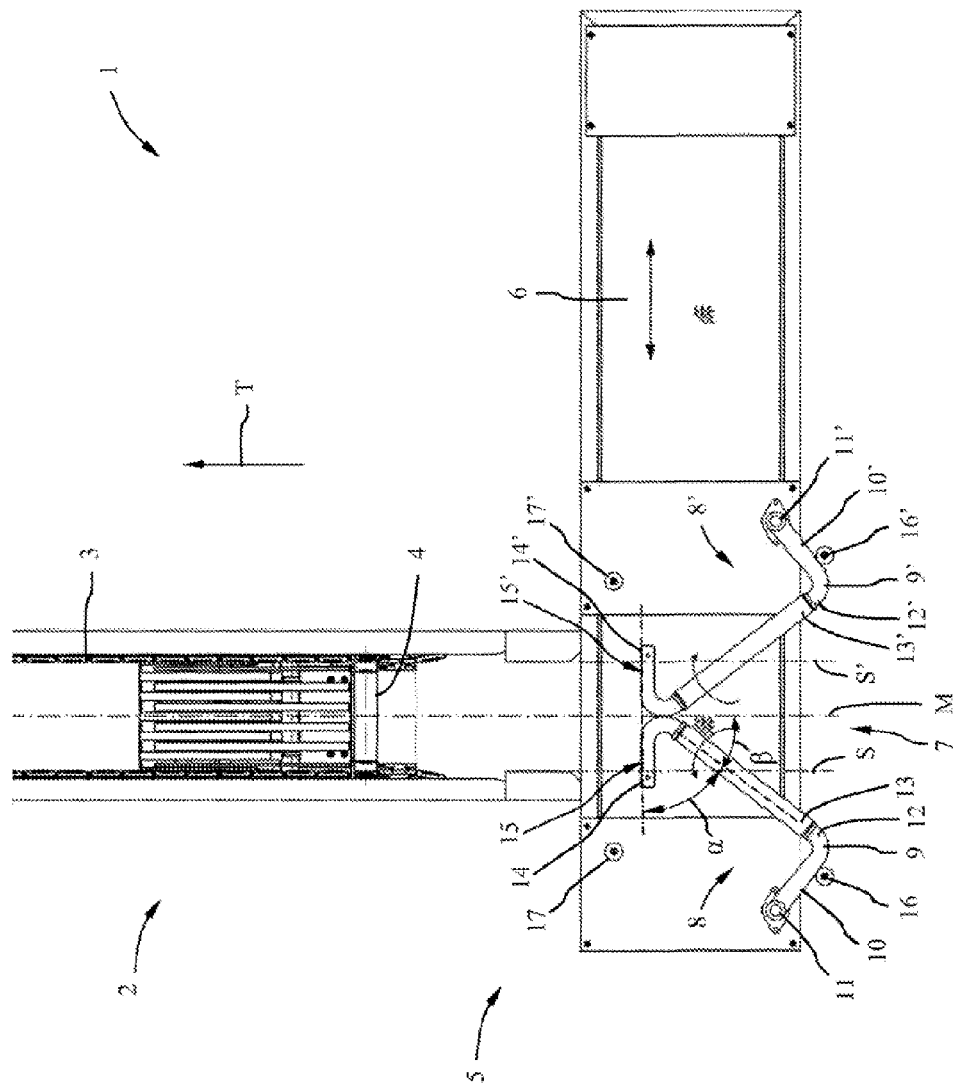
FIG. 1, a top view of a section of a vehicle treatment system with drive-in aid in accordance with the invention in an approach position.

FIG. 1 shows a drive-in area of a vehicle treatment system 1 designed as a vehicle washing system with a conveying device 2, which is in fact known, for transporting a vehicle to be washed in a transporting direction T through the vehicle treatment system 1. Only the drive-in area of the conveying device 2 is shown in the drawings. The conveying device 2 engages a nondepicted tire of the vehicle from behind with a drag roller 4 conducted by a conveying chain 3, and then drags it in the transporting direction T through the vehicle treatment system 1. Symmetrical to a center line M imagined as running in a transporting direction T, imaginary side lines S, S' delimit a desired lane 7 for the tire, in which it can be dragged by the conveying device 2 free of damage.

Directly in front of the conveying device 2, a drive-in aid 5 according to the invention is arranged with a known movably supported base plate 6 that is perpendicular to the transport direction T.

In the drive-in area of the vehicle treatment system 1, two guide elements 8, 8' are located symmetrical to the middle line M. Since the guide elements 8, 8 are designed in an identical manner, they are described below using the left guide element 8 in the drawings. Reference symbols of the right guide element 8' correspond to those of the left guide element 8 with an apostrophe.

The guide element 8 has a stirrup-shaped roller 9, which has an L-leg 10 bent in the shape of an L on its front ends in the transporting direction T. The L-leg 10 is rotatably linked with its front end on a rotating leg 11 with a rotating axis that is perpendicular to the bottom or the base plate 6, so that the guide element 8 can move back and forth in a plane between the approach position and the drive-through position running essentially parallel to the base plate 6.

On a roller leg 12 of the roller stirrup 9 that follows the L-leg 10, an approach roller 13 is supported so that it can rotate around the longitudinal axis of the roller leg 12. The function of the approach roller 13 corresponds to the function of the known approach rollers.

On its other back end in the transporting direction T, the roller stirrup 9 has a stop leg 14, which points in the form of a heel toward the free L-leg 10. The stop leg 14 forms, in the approach position of the roller stirrup 9 shown in FIG. 1, a back rolling stop 15 for a tire already found in the transporting direction T behind the drive-in aid 2.

In order to press a moving-in tire that is not in the desired lane 7 into the lane 7, the roller stirrups 9, 9' are always pressed toward the middle line M or to the lane 7 by restoring drives in the form of restoring springs, which are found below the rotating legs 11, 11' and which are not visible in the drawings. In this way, a force component directed transverse to the transporting direction T in the direction of the middle line M acts on the tire, which is then moved together with the base plate 6 in the direction of the lane 7. Advantageously, the restoring drives also have energy-consuming dampening elements, which dampen the force exerted by the tire on the guide elements 8, 8'.

The restoring force of the restoring drives is thereby advantageously adjusted in such a way that with an increasing deflection of the roller stirrups 9, 9' from the approach position, it becomes larger and larger. In the embodiment shown in FIGS. 1 to 3, the restoring force in the approach position shown in FIG. 1 on the movable stop ends 14, 14' of the roller legs 12, 12' is approximately 100 N, whereas it is approximately 800 N shortly before the drive-through position according to FIG. 2.

A tire located far from the middle line M outside the lane 7 is thus moved toward the lane 7 with a greater force than a tire that deviates only slightly from the middle line M, since it causes a considerable deflection of one of the roller stirrups 9, 9' from the approach position. In this way, a quick centering of the tire with respect to the middle line M is guaranteed, on the one hand, which is advantageous because of the short travelling path of the drive-in aid 5 up to the conveying device 2, whereas, on the other hand, the force applied on the tire is as small as possible, so as to avoid damage to the tire or to the tire sidewall.

The restoring drives also ensure that before a tire is driven in, whether the back tire of the same vehicle or the front tire of the next vehicle, the roller stirrups 9, 9' are again returned to the approach position. Thus, in particular, the back tire of a vehicle can also be brought into the lane 7 without any damage.

Furthermore, approach stops 16, 16' for the roller stirrups 9, 9' are provided in the transporting direction T before the base plate 6, against which the L-legs 10, 10' stop in the approach position with the action produced by the restoring force of the restoring drives. In this way, we avoid the hooking or tilting of the roller stirrups 9, 9' and ensure the symmetrical approach position shown in FIG. 1. In addition, this guarantees that the back rolling stops 15, 15' are kept in the approach position, so that a vehicle rolling contrary to the transporting direction can no longer roll out of the drive-in area, since the tire already found behind the drive-in aid 5 in the transporting direction T is stopped by the back rolling stops 15, 15'. This advantageously prevents damage to the conveying device 2, to the tires, and also to the vehicle. After the tire is placed in the position provided for the dragging with the drag roller 4, the vehicle drive is normally turned off, and the parking brake of the vehicle is released, so that the drag roller 4 can drag along the tire and the vehicle. If the vehicle were to roll back in the time up to the engagement of the drag roller 4, however, then it could block, for example, the delivery path of the drag roller or drive into a vehicle standing behind it in the transporting direction T, which is to be subsequently washed.

Advantageously, to this end, an angle α shown in FIG. 1 between the back rolling stop 15 and the rolling leg 12 of the rolling stirrup 9 is selected so that with an angle β between the roller leg 12 in the approach position and the middle line M, it adds up to 90°. The back rolling stop 15 and the identically designed back rolling stop 15' then run in the approach position transverse to the transporting direction T and thus form a large stop surface for a tire.

Figure 2:
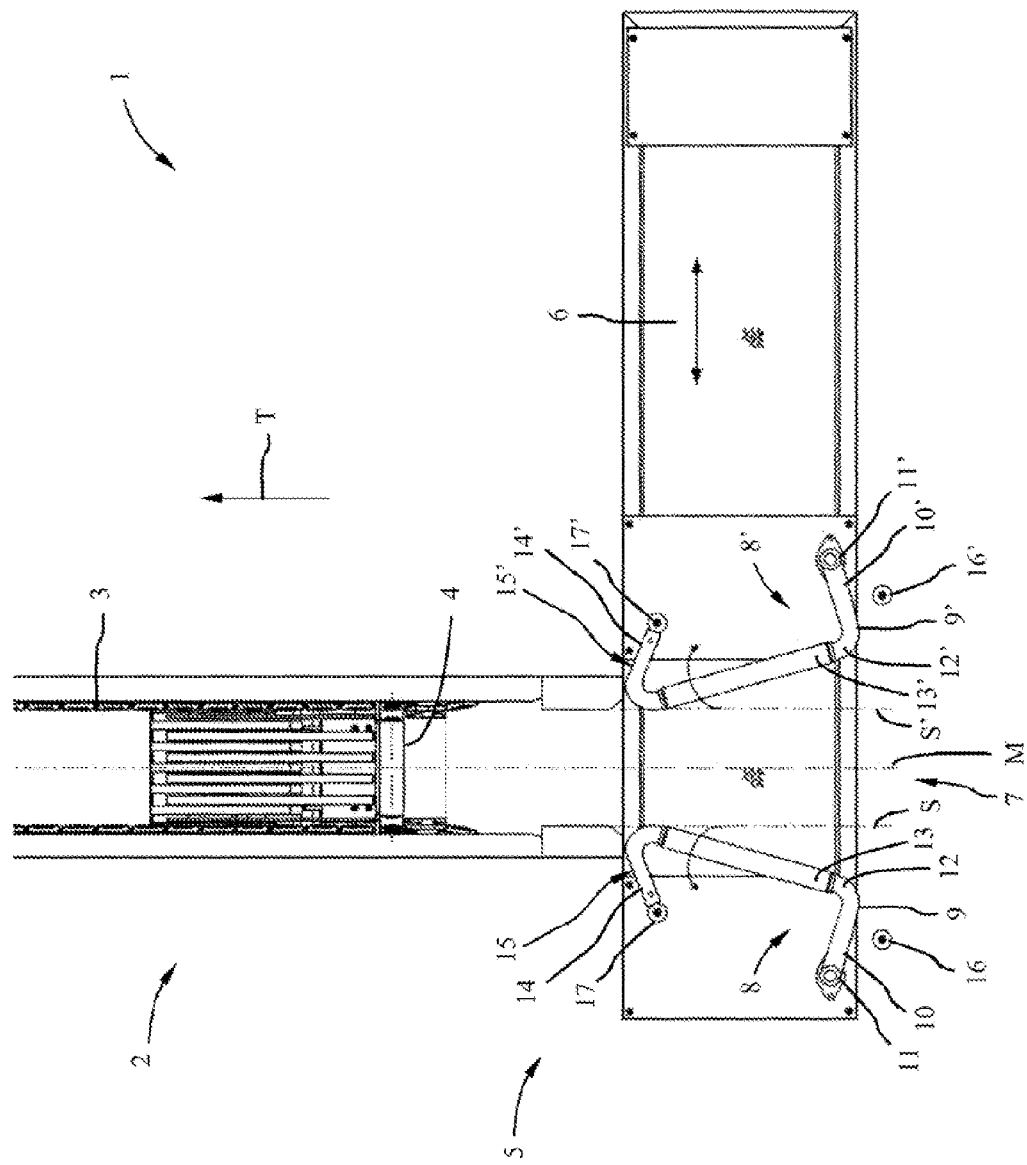
FIG. 2, the top view of FIG. 1 with the drive-in aid in a drive-through position.

In the drive-through position shown in FIG. 2, the roller stirrups 9, 9' delimit the lane 7 laterally, so that a driving-through tire is conducted in the lane 7 and cannot approach the lateral parts of the conveying device 2. In order to prevent the roller stirrups 9, 9' from being pressed out of the drive-through position by the driving-through tire, drive-through stops 17, 17' are arranged behind the rotating legs 11, 11' in the transporting direction T, at which the free ends of the stop legs 14, 14' stop.

Figure 3:
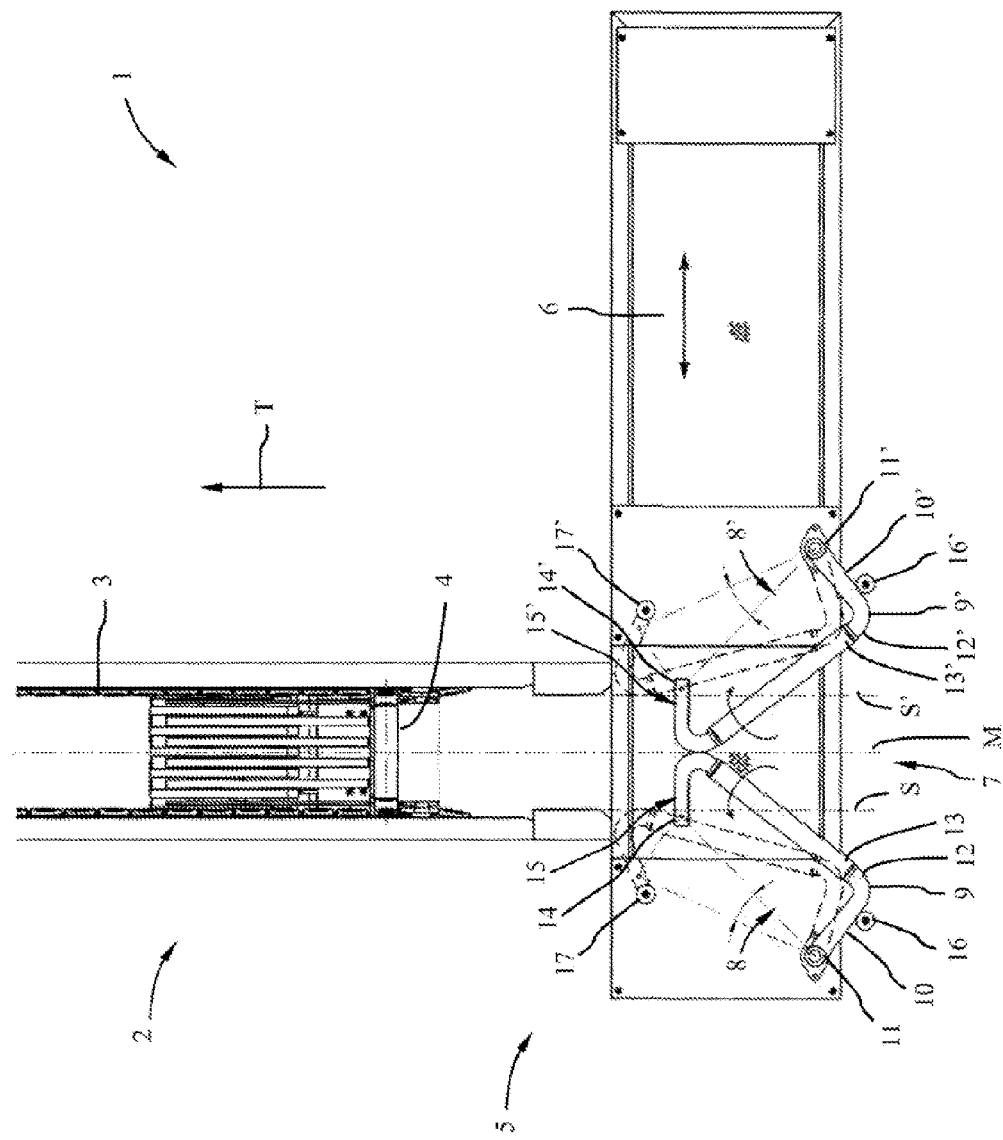
FIG. 3, the top view from FIG. 1 with the positions of the drive-in aid shown in FIGS. 1 and 2.
Figure 4:
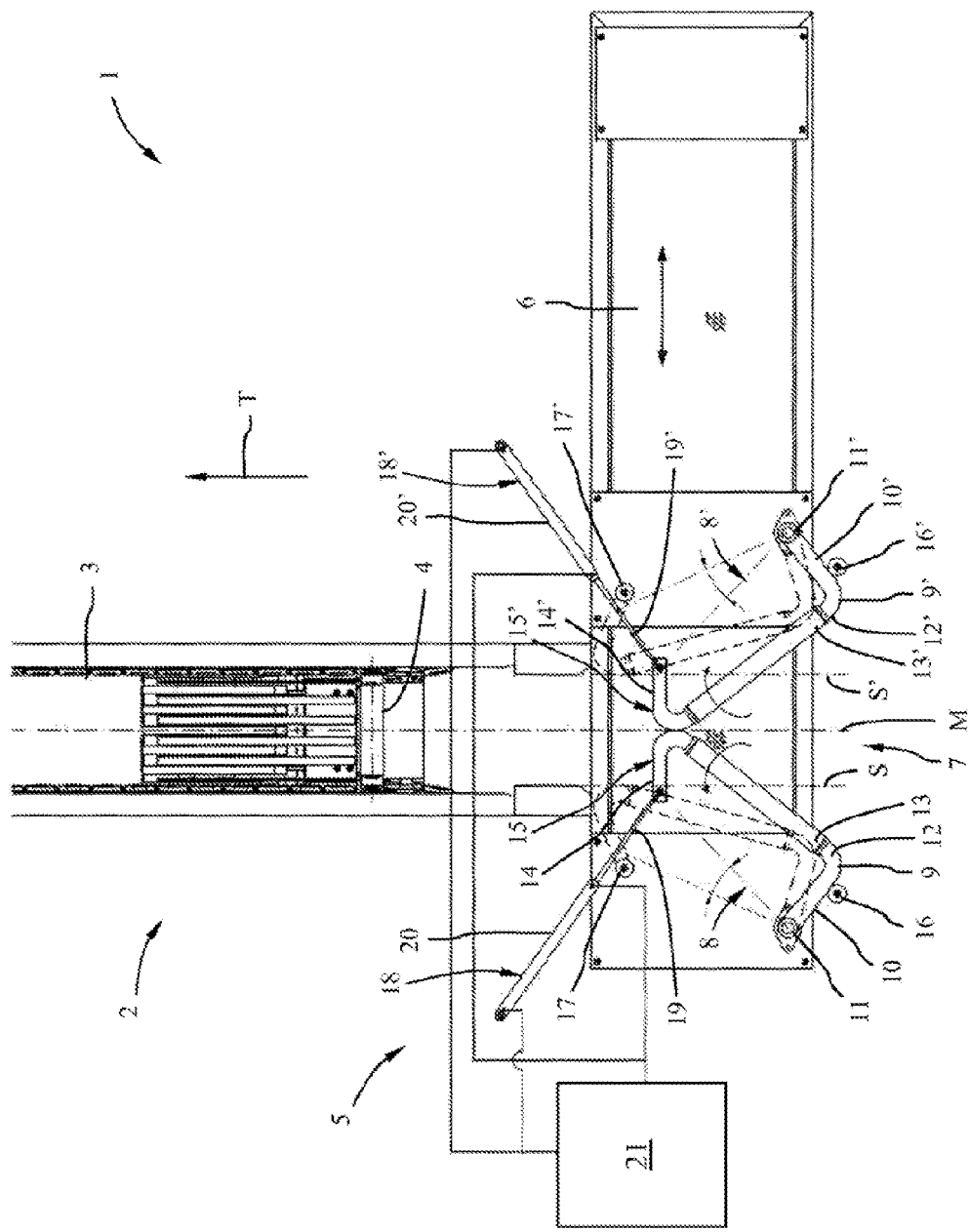
FIG. 4, a top view in accordance with FIG. 3 of an alternative development of a drive-in aid in accordance with the invention.

The embodiment of a drive-in aid 2 in accordance with the invention shown in FIG. 4, essentially differs by the design of the restoring drive of the embodiment shown in FIGS. 1 to 3.

For this reason, the same reference symbols are used for the same parts and mainly the differences are discussed.

In the embodiment in accordance with FIG. 4, the restoring drives of the two roller stirrups 9, 9' are formed by controllable, double-acting pneumatic cylinders 18, 18'. Piston rods 19, 19' of the pneumatic cylinders 18, 18' are hereby articulated in a rotatable manner on the free ends of the stop legs 14, 14', whereas stationary cylinders 20, 20' are articulated on the drive-in aid 5 or another part or area of the washing system 1. The pneumatic cylinders 18, 18' are controlled in a manner that is, in fact, known by a pneumatic control 21.

By means of these pneumatic cylinders 18, 18', it is possible to arbitrarily set the restoring force on the roller stirrups 9, 9' within a broad range. For example, the restoring force can be selected larger in all areas from the approach position to the drive-through position, if a heavy vehicle with wide and large tires drives into the drive-in aid. With a light vehicle, on the other hand, the restoring force is selected smaller. Also, with this embodiment, it is possible to advantageously do without the approach stops 16, 16' and/or the back rolling stops 17, 17', since the roller stirrups 9, 9' can be held in place in the approach or drive-through positions by the pneumatic cylinders 18, 18'. Thus, in a simple manner, the restoring force can be adapted by the pneumatic cylinders 18, 18' to the desired requirements in different deflection areas of the roller stirrups 9, 9'.

In another nondepicted embodiment, single-acting pneumatic cylinders can also be used instead of the double-acting cylinders 18, 18' shown in FIG. 4; they can apply the restoring force on the roller stirrups 9, 9' in the direction of the approach position.

In another nondepicted embodiment, the base plate 6 supported so it can move transverse to the transporting direction T can also be advantageously implemented by other means, which permit a shifting of the tire of a driving-in vehicle and thus of the driving-in part of the vehicle itself. Thus, instead of the base plate 6 in the drive-in area of the vehicle tire, which is to be grasped by the drive-in aid, several longitudinal rollers can also be provided next to one another, whose rotating axes essentially run in the transporting direction T. If the tire of the vehicle then moves on these longitudinal rollers, it can be shifted laterally. Preferably, such longitudinal rollers can be provided in the drive-in areas of both simultaneously driving-in tires of the vehicle, so that when driving in, both tires can be moved transverse to the transporting direction.

Instead of the restoring drives with restoring springs or pneumatic cylinders described in the preceding, it is also possible to use suitable drives, for example, hydraulic cylinders, which can make available the restoring force as described above.

The invention claimed is:

1. A drive-in aid for a conveying device for a vehicle treatment system, the conveying device for transporting a vehicle to be treated in a transport direction through the vehicle treatment system, the drive-in aid comprising:
   a lane for tires of the vehicle to be treated, the lane running in the transporting direction;
   a base plate movable in a direction transverse to the transporting direction; and
   two guide elements at least partially converging above the base plate in the transporting direction, the guide elements movable back and forth between an approach position and a drive-through position, wherein in the approach position the guide elements extend into the lane and converge in the transporting direction and in the drive-through position the guide elements laterally define the lane.

2. The drive-in aid according to claim 1, wherein the drive-in aid is located in the drive-in area of the conveying device.

3. The drive-in aid according to claim 1, further comprising two restoring drives, each restoring drive operably-correlated with each guide element, the restoring drives moving the guide elements into the approach position, wherein a restoring force applied by the restoring drives on the guide elements increases with increasing deflection of the guide elements from the approach position.

4. The drive-in aid according to claim 3, wherein the restoring force is adjustable.

5. The drive-in aid according to claim 3, wherein each restoring drive includes a restoring spring which presses the guide element into the approach position.

6. The drive-in aid according to claim 3, wherein each restoring drive includes a pneumatically or a hydraulically-actuatable restoring cylinder.

7. The drive-in aid according to claim 6, wherein each guide element is articulated on a front end on a rotating axis in the transporting direction, the rotating axis running perpendicular to the base plate.

8. The drive-in aid according to claim 7, wherein each guide element includes a rotating leg, the rotating leg having a rotating axis perpendicular to the base plate.

9. The drive-in aid according to claim 8, further comprising an approach stop lying before each rotating leg in the transporting direction, the approach stops operably-correlated with the guide elements.

10. The drive-in aid according to claim 8, further comprising a drive-through stop lying behind each rotating leg in the transporting direction, the drive-through stops operably-correlated with the guide elements.

11. The drive-in aid according to claim 10, wherein the guide elements further comprise approach rollers, the approach rollers rotating around a rotating axis parallel to the base plate.

12. The drive-in aid according to claim 10, wherein the guide elements further comprise back rolling stops on back ends in a transporting direction, the back rolling stops extending into the lane in the approach position of the guide elements.

13. The drive-in aid according to claim 12, wherein the back rolling stops run transverse to the transporting direction.

14. A vehicle treatment system comprising:
    a conveying device to transport a vehicle to be treated through the vehicle treatment system in a transporting direction; and
    a drive-in aid arranged before the conveying device in the transporting direction, the drive-in aid comprising:
    a lane for tires of the vehicle to be treated, the lane running in the transporting direction;
    a base plate movable in a direction transverse to the transporting direction; and
    two guide elements at least partially converging above the base plate in the transporting direction, the guide elements movable back and forth between an approach position and a drive-through position, wherein in the approach position the guide elements extend into the lane and converge in the transporting direction and in the drive-through position the guide elements laterally define the lane.

15. The vehicle treatment system according to claim 14, wherein the vehicle treatment system is a vehicle washing system.

16. A drive-in aid for a conveying device for a vehicle treatment system, the conveying device for transporting a vehicle to be treated in a transport direction through the vehicle treatment system, the drive-in aid comprising:
- a lane for tires of the vehicle to be treated, the lane running in the transporting direction;
- a plurality of longitudinal rollers having rotating axes running in the transporting direction adjacent one another, the plurality of longitudinal rollers for shifting tires of the vehicle to be treated laterally; and
- two guide elements at least partially converging above the plurality of longitudinal rollers in the transporting direction, the guide elements movable back and forth between an approach position and a drive-through position, wherein in the approach position the guide elements extend into the lane and converge in the transporting direction and in the drive-through position the guide elements laterally define the lane.

17. The drive-in aid according to claim 16, further comprising a base plate movable in a direction transverse to the transporting direction.

18. The drive-in aid according to claim 16, wherein the drive-in aid is located in the drive-in area of the conveying device.

19. A vehicle treatment system comprising the drive-in aid according to claim 16.

\* \* \* \* \*